(12) United States Patent
Ohtomo et al.

(10) Patent No.: US 6,314,651 B1
(45) Date of Patent: Nov. 13, 2001

(54) ROTARY LASER IRRADIATING SYSTEM AND PHOTODETECTION SYSTEM

(75) Inventors: Fumio Ohtomo; Kunihiro Hayashi, both of Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 09/447,697

(22) Filed: Nov. 23, 1999

(30) Foreign Application Priority Data

Dec. 3, 1998 (JP) .................................................. 10-344100

(51) Int. Cl.⁷ .............................. G01C 5/00; G01C 15/00; G01K 1/00; G01J 5/02; G01B 11/00
(52) U.S. Cl. ..................... 33/290; 33/DIG. 21; 33/285; 33/286; 33/291; 33/292; 356/399
(58) Field of Search ............................. 33/290, 281, 282, 33/285, 286, DIG. 21, 291, 292, 276, 277; 356/399, 400, 4.08

(56) References Cited

U.S. PATENT DOCUMENTS

| | | | |
|---|---|---|---|
| 5,485,266 | | 1/1996 | Hirano et al. ........................ 356/249 |
| 5,533,268 | * | 7/1996 | Keightley .............................. 33/290 |
| 5,742,387 | * | 4/1998 | Ammann ............................... 33/290 |
| 5,798,498 | * | 8/1998 | Zair ....................................... 356/399 |
| 5,823,679 | * | 10/1998 | Hollander et al. .............. 33/DIG. 21 |
| 5,838,431 | * | 11/1998 | Hara et al. ............................ 33/290 |
| 5,839,829 | * | 11/1998 | Litvin et al. ......................... 356/399 |
| 5,907,907 | * | 6/1999 | Ohtomo et al. ....................... 33/291 |
| 5,978,076 | * | 11/1999 | Kitajima .............................. 356/400 |
| 6,049,378 | * | 4/2000 | Busch et al. ......................... 356/399 |
| 6,073,353 | * | 6/2000 | Ohtomo et al. ....................... 33/290 |
| 6,163,969 | * | 12/2000 | Jan et al. ............................... 33/282 |
| 6,172,742 | * | 1/2001 | Yamazaki ........................... 356/4.08 |
| 6,183,129 | * | 2/2001 | Aoyama et al. ............... 33/DIG. 21 |
| 6,195,901 | * | 3/2001 | Falb ...................................... 33/286 |
| 6,202,312 | * | 3/2001 | Rando ................................... 33/286 |

* cited by examiner

Primary Examiner—Andrew H. Hirshfeld
Assistant Examiner—Yaritza Guadalupe
(74) Attorney, Agent, or Firm—Nields & Lemack

(57) ABSTRACT

The system according to the present invention comprises means for irradiating a plurality of laser beams by separating the laser beams in a vertical direction and means for forming a plurality of laser beam reference planes by rotary irradiation of said plurality of laser beams. Because a plurality of reference planes are formed at the same time, operation can be carried out at the same time at different working sites, and the tilt reference line as desired can be promptly obtained without performing tilt setting operation for the reference plane.

13 Claims, 6 Drawing Sheets

BEAM DIVIDING STATUS

PHOTODETECTION SIGNAL

ROTARY LASER IRRADIATING SYSTEM AND PHOTODETECTION SYSTEM

BACKGROUND OF THE INVENTION

The present invention relates to a rotary laser irradiating system for forming a reference point, a reference line and a reference plane for measurement by projecting laser beam or by reciprocally scanning and rotating laser beam, and, in particular, for simultaneously forming a tilt setting plane tilted at a predetermined angle with respect to a horizontal reference plane in addition to the horizontal reference plane. The invention also relates to a photodetection system for identifying a plurality of reference planes formed by the rotary laser irradiating system without erroneously recognizing the reference planes.

With the purpose of providing a horizontal reference level for a wide range, a rotary laser irradiating system is now used instead of an optical type leveling system.

In recent years, the rotary laser irradiating system has been used for the case where a line or a plane is formed according to the measurement in a height direction—in particular, according to a reference height. In the rotary laser irradiating system, laser beam is irradiated in a horizontal direction, or it is rotated or reciprocally scanned or stopped, and a rotary reference plane is formed or a partial reference line, a reference plane, and further, a reference line and a reference point are formed.

For example, it is used for forming a reference horizontal line for the purpose of positioning of window frames in interior finishing work, or for forming a reference horizontal plane with the purpose of ground filling or for forming graded soil surface in civil engineering and construction work. Further, the rotary laser irradiating system is also used for the setting of a reference point to determine tilting in case of construction of staircase, for example. There are also systems for forming a reference plane, which is tilted in one or two directions.

A conventional type rotary laser irradiating system for forming a tilted reference plane is disclosed in JP-A-6-26861. Brief description will be given now on this conventional type rotary laser irradiating system referring to FIG. 11.

At the center on the upper surface of a casing 1, a recessed portion 2 in shape of truncated cone is formed. A laser projector 3 is penetrating the center of the recessed portion 2 in a vertical direction, and the laser projector 3 is tiltably supported on the recessed portion 2 via a spherical seat 4. The head of the laser projector 3 has a pentagonal prism 9 and is acting as a rotator 5 which is freely rotated. The rotator 5 is rotated by a scanning motor 6 via a driving gear 7 and a scanning gear 8. Around the laser projector 3, two sets of tilting mechanisms 10 (only one is shown in the figure) are provided. The tilting mechanism 10 comprises a tilting motor 11, a tilting screw 12, and a tilting nut 13, and the tilting motor 11 rotates the tilting screw 12 via a driving gear 14 and a tilting gear 15. The tilting nut 13 is connected to the laser projector 3 via a tilting arm 16. When the tilting motor 11 is driven, the tilting nut 13 is moved up or down, and when the nut is moved up or down, the laser projector 3 is tilted.

At the middle of the laser projector 3, there are provided a fixed tilt sensor 18 positioned in parallel to the tilting arm 16 and a fixed tilt sensor 19 positioned perpendicularly to the fixed tilt sensor 18. At the lower end of the laser projector 3, a flange 20 is fixedly mounted. On a pivot pin 21 erected on the flange 20, an L-shaped tilt base 22 is pivotally supported on the corner. Two edges of the tilt base 22 running perpendicularly to each other are connected to two sets of tilt setting mechanisms 25 (only one is shown in the figure) respectively. On the tilting base 22, an angle setting tilt sensor 29 is arranged in the same direction as the fixed tilt sensor 18, and an angle setting tilt sensor 30 is arranged in the same direction as the fixed tilt sensor 19.

The tilt setting mechanism 25 comprises a tilt angle setting motor 26, a tilt setting screw 27 to be rotated by the tilt angle setting motor 26, and a nut block 28 screwed on the tilt setting screw 27, and one end of the tilting base 22 is engaged with the nut block 28. When the tilt angle setting motor 26 is driven, the nut block 28 is moved up or down via the tilt setting screw 27, and the tilting base 22 is tilted.

Inside the laser projector 3, a projection optical system (not shown) is incorporated, which comprises a laser light emitting unit (not shown) and a collimator lens to turn the laser beams emitted from the laser light emitting unit to parallel beams. The laser beams from the projection optical system are deflected to the horizontal direction by the pentagonal prism 9 and are projected through a projection window 31.

The setting of tilt angle is performed by the tilt setting mechanism 25. With the fixed tilt sensors 18 and 19 indicating horizontal position, the tilt angle setting motor 26 is driven, and the tilt setting screw 27 is rotated to move the nut block 28 up or down, and the tilting base 22 is tilted by the same angle θ as the setting angle in a direction opposite to the setting angle. Tilt angle of the tilting base 22 is detected by an encoder, etc. which is connected to the tilt angle setting motor 26.

Next, the laser projector 3 is tilted in a tilting direction by the tilting mechanism 10. When the tilting base 22 detects horizontal position, the angle of the laser projector 3 is at the setting tilt angle. With the tilt angle of the laser projector 3 set in the setting condition, laser beams are irradiated in the horizontal direction from the laser projector 3 via the pentagonal prism 9, and the rotator 5 is rotated or reciprocally scanned within a predetermined angle, and a tilted reference plane is formed.

In order to form a tilted reference plane in the conventional type rotary laser irradiating system as described above, it is necessary to support the laser projector 3 so that it can be freely tilted and also to have two sets of tilt setting mechanisms to tilt in two directions. Also, it is necessary to have an angle setting tilt sensor 29 in the same direction as the fixed tilt sensor 18. Further, a control circuit is required for driving and controlling the two sets of tilt setting mechanisms. This makes the system more complicated and requires higher manufacturing cost. Further, in the conventional type rotary laser irradiating system as described above, only one reference plane can be formed. Therefore, it is not possible to form a tilted reference plane with respect to the horizontal reference plane at the same time, and relative relation between the horizontal reference and the tilted reference plane or the relative relation between two tilted reference planes with different tilt angles cannot be determined.

SUMMARY OF THE INVENTION

It is a first object of the present invention to provide a system, by which it is possible to form a plurality of reference planes at the same time without tilting the laser projector. It is a second object of the present invention to provide a system, by which it is possible to identify each of references planes on light receiving side without causing erroneous operation when a plurality of reference planes are formed at the same time.

To attain the first object, the rotary laser irradiating system of the present invention comprises means for irradiating a plurality of laser beams by separating the laser beams in a vertical direction and means for forming a plurality of laser beam reference planes by rotary irradiation of the plurality of laser beams. Further, the rotary laser irradiating system of the present invention comprises a laser light emitting unit for emitting a plurality of laser beams, a rotator for projecting laser beams emitted from the laser light emitting unit by rotary irradiation and for forming a laser reference plane, and an image rotator prism disposed between the rotator and the laser light emitting unit and synchronously rotated with the rotator at a rotation ratio of 1:2. Also, the present invention provides a rotary laser irradiating system as described above, wherein there is further provided laser beam exit angle changing means for changing an exit angle of the laser beam emitted from the laser light emitting unit. Further, the present invention provides a rotary laser irradiating system as described above, wherein the laser beam exit angle changing means comprises an optical member which is inserted into or removed from optical path of the laser beam emitted from the laser light emitting unit. Also, the present invention provides a rotary laser irradiating system as described above, wherein the laser light emitting unit has a plurality of independently driven light emitting elements for emitting a plurality of laser beams, wherein each of the light emitting elements can be modulated to different frequencies. Also, the present invention provides a rotary laser irradiating system as described above, wherein the laser light emitting unit has a plurality of independently driven light emitting elements for emitting a plurality of laser beams, wherein each of the light emitting elements can be flashed in different manner. Further, the present invention provides a rotary laser irradiating system as described above, wherein the plurality of laser beams is diffused respectively in a rotating direction. Also, the present invention provides a rotary laser irradiating system as described above, wherein each of the laser beams is divided to a plurality of parts in a rotating direction, and aspect of division is different and specific to each of the laser beams. Also, the present invention provides a rotary laser irradiating system as described above, wherein the laser beams are divided by a diffraction pattern.

Further, to attain the second object, a photodetection system of the present invention comprises a photodetection unit capable to receive a plurality of laser beams irradiated from a rotary laser irradiating system, a photodetection status identifier for calculating photodetection status based on photodetection signal from the photodetection unit, and a display unit for displaying a result of calculation of the photodetection status identifier. Also, the present invention provides a photodetection system as described above, wherein the photodetection status identifier stores identification data relating to data such as a type of the laser beam and a tilt angle of the laser beam for each type of laser beam and is capable to identify the laser beam based on the identification data. Also, the present invention provides a photodetection system as described above, wherein the photodetection status identifier has an arithmetic operation program for calculating distance to the rotary laser irradiating system based on a photodetecting position of the laser beam and on the identification data when the photodetection status identifier receives a plurality of laser beams. Further, the present invention provides a photodetection system as described above, wherein the display unit is capable to display group display of the identification data relating to a plurality of laser beams irradiated at one time from the rotary laser irradiating system. Also, the present invention provides a photodetection system as described above, wherein the display unit is capable to display selective group display on a plurality of laser beams irradiated at one time from the rotary laser irradiating system.

According to the rotary laser irradiating system of the present invention, a plurality of reference planes are formed at the same time, and this makes it possible to carry out operation at different working points at the same time, and the tilt reference line as desired can be promptly obtained without performing tilt setting operation for the reference plane.

According to the photodetection system of the present invention, each of a plurality of laser beams irradiated from the rotary laser irradiating system at the same time can be individually identified, and the distance between the photodetection system and the rotary laser irradiating system can be determined. Then, the result of identification or the result of calculation is displayed on the display unit.

DETAILED DESCRIPTION OF THE PREFERRED EMBODIMENTS

In the following, description will be given on embodiments of the present invention referring to the attached drawings.

Figure 1:
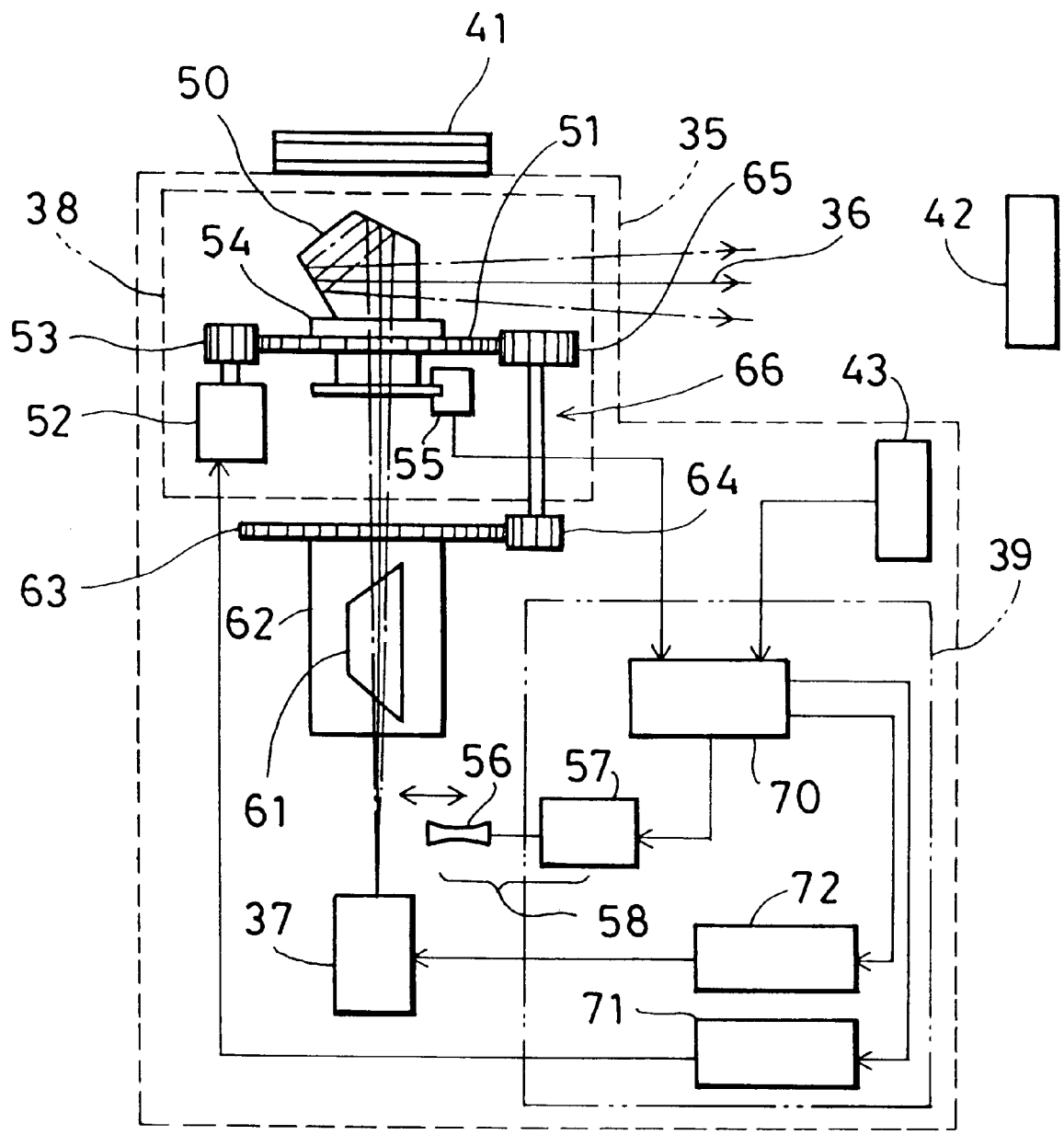
FIG. 1 is a block diagram showing an essential portion of an embodiment of a rotary laser irradiating system of the present invention.
Figure 2:
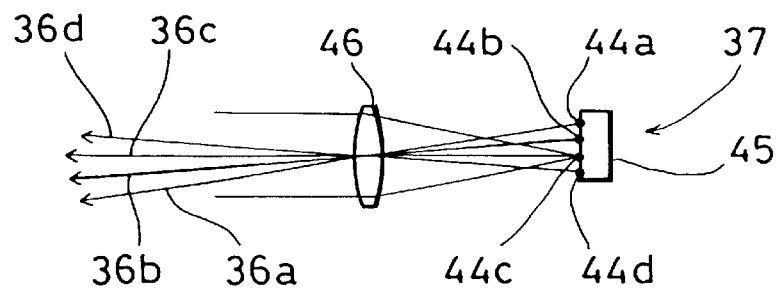
FIG. 2 is a drawing to explain a light emitting unit used in the above embodiment.

FIG. 1 shows an essential portion of a rotary laser irradiating system 35, and the rotary laser irradiating system 35 comprises a light emitting unit 37 for emitting a plurality of laser beams 36, a rotator 38 for projecting the laser beams 36 by rotary irradiation to a reference plane, and a control unit 39 for controlling rotation of the rotator 38 and light emitting condition of the laser light emitting unit 37. On the upper surface of the rotary laser irradiating system 35, a collimator 41 is provided, which can approximately set a direction of the rotary laser irradiating system 35 with respect to a photodetection system 42. The rotary laser irradiating system 35 comprises a photodetection unit 43 so that the laser beams reflected from the photodetection system 42 can be received.

The laser light emitting unit 37 comprises a light emitting element 45 where as many laser diodes 44a 44b, 44 and 44d as required (4 diodes shown in the figure) are aligned along a straight line, and a collimator lens 46. Each of the laser beams 36 emitted from the light emitting element 45 is turned to a parallel beam and is projected at a predetermined angle with respect to the optical axis.

On the optical axis of the collimator lens 46, the rotator 38 is rotatably arranged so that it can be rotated around the optical axis of the collimator lens 46. A scanning gear 51 is mounted on the rotator 38, and the scanning gear 51 is engaged with a driving gear 53 of a scanning motor 52, which is fixed on a frame (not shown) of the rotary laser irradiating system 35. When the driving gear 53 is driven, the rotator 38 is rotated via the scanning gear 51.

The scanning gear 51 is fixed on a rotating cylinder 54 which is rotatably supported. On top of the rotating cylinder 54, a pentagonal prism 50 is mounted, and an encoder 55 for detecting an irradiating direction of the laser beams 36 is arranged at a predetermined position on the rotating cylinder 54.

Between the laser light emitting unit 37 and the rotator 38, a concave lens 56 is arranged on the optical axis of the collimator lens 46 so that it can be moved in from or moved out in a direction perpendicular to the optical axis. It is designed in such manner that the concave lens 56 can be moved in or out on the optical axis of the collimator lens 46 by a tilt angle change driving unit 57. The concave lens 56 and the tilt angle change driving unit 57 constitute a laser beam exit angle changing means 58. By the laser beam exit angle changing means 58, a plurality of groups of the projected laser beams is formed. For example, in a first group, a tilt angle of a laser beam of a first stage is −15°, that of a laser beam of a second stage is 0°, that of a third stage is 15°, that of a fourth stage is 30°, and that of a fifth stage is 45°. In a second group, a tilt angle of a laser beam of a first stage is −10°, that of a second stage is 0°, that of a third stage is 10°, that of a fourth stage is 20°, and that of a fifth stage is 40°. The concave lens 56 may be a convex lens, a diffraction lens or a hologram so long as it can vary fan-shaped spreading of the laser beams.

On the optical axis of the collimator lens 46 between the rotator 38 and the concave lens 56, an image rotator prism 61 is disposed. The image rotator prism 61 has such an effect that, when it is rotated by one turn, the image is rotated by two turns. As described later, the image rotator prism 61 is connected with the rotator 38 to have a rotation ratio of 1:2.

The image rotator prism 61 is held by a prism holder 62, which is rotatably supported. A synchronizing gear 63 is arranged on the prism holder 62, and an idle gear 64 is engaged with the synchronizing gear 63. An idle gear 65 is engaged with the scanning gear 51, and the idle gears 65 and 64 are coaxially fixed. A gear train 66 is formed by the scanning gear 51, the idle gear 65, the idle gear 64 and the synchronizing gear 63, and rotation ratio of the scanning gear 51 and the synchronizing gear 63 is a speed reducing ratio of 2:1.

When the rotator 38 is rotated by two turns, the image rotator prism 61 is rotated by one turn.

Figure 3:
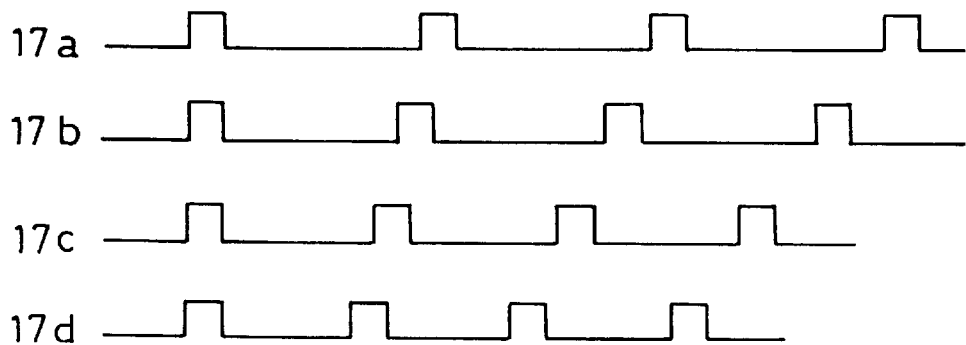
FIG. 3 is a drawing to explain modulation status of the laser beam emitted from the light emitting unit.

The control unit 39 primarily comprises an arithmetic unit 70, a scanning motor driving unit 71, a light emitting element driving unit 72, and the tilt angle change driving unit 57. The arithmetic unit 70 controls the scanning motor driving unit 71 and drives the scanning motor 52. The arithmetic unit 70 further controls the light emitting element driving unit 37 and controls the tilt angle change driving unit 57. The light emitting element driving unit 72 modulates the laser diodes 44a, 44b, 44c and 44d to predetermined frequencies as shown in FIG. 3. Further, each of the laser diodes 44a, 44b, 44c and 44d can be flashed at a predetermined timing by the light emitting element driving unit 72.

Laser beams 36a, 36b, 36c and 36d emitted from the laser diodes 44a, 44b, 44c and 44d of the light emitting element 45 are within the vertical plane. As already described, the scanning gear 51 and the synchronizing gear 63 are synchronously rotated at the rotation ratio of 2:1 by the gear train 66. When the image rotator prism 61 is rotated by one turn, the image is rotated by two turns as described above. Thus, the optical axis of the light entering the pentagonal prism 50 is synchronized with rotation of the pentagonal prism 50 and it is rotated at a rotation ratio of 1:1. Regardless of the rotating position of the pentagonal prism 50, the laser beams 36a, 36b, 36c and 36d irradiated from the pentagonal prism 50 are irradiated with positioning within the vertical plane.

Figure 4:
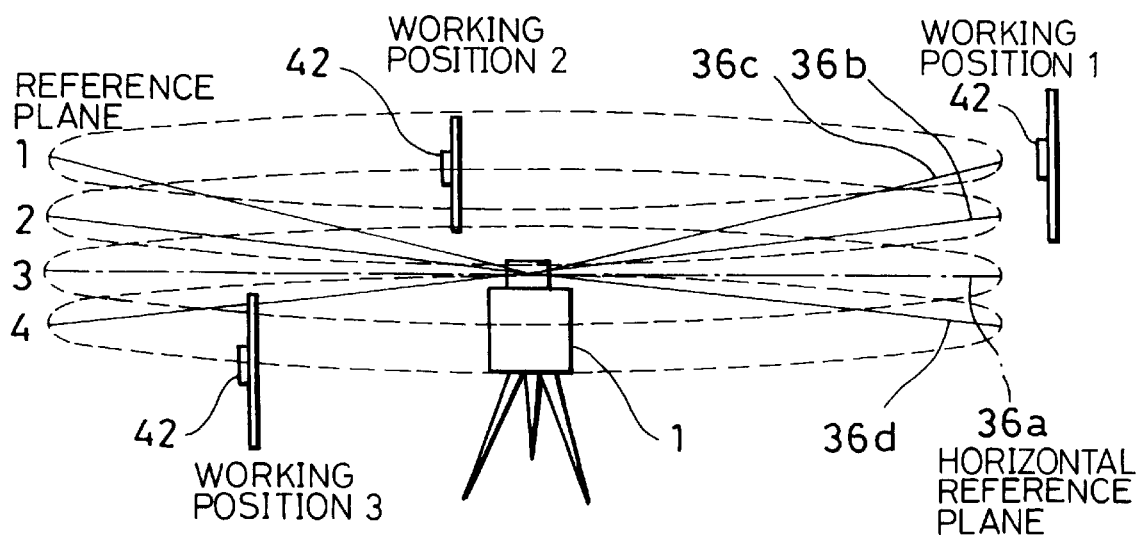
FIG. 4 is a drawing to explain a condition to form a reference plane in the above embodiment.

When the laser beams 36 are emitted from the light emitting element 45 and the scanning motor 52 is driven via the scanning motor driving unit 71, a plurality of conical reference planes are formed outside the horizontal reference plane as shown in FIG. 4 by the plurality of the laser beams 36a, 36b, 36c and 36d. Therefore, a tilted reference line can be obtained from each of the conical reference planes. If an angle of each of the laser beams 36b, 36c and 36d is set to a predetermined value with respect to the optical axis, it is possible to obtain tilted reference lines each tilted at a desired angle with respect to the horizontal line. Tilt angle can be set by the tilted reference line. Further, distance setting and positioning can be performed in the tilted direction. If a plurality of reference planes is formed at the same time by the laser beams 36b, 36c and 36d, operation can be carried out by forming different reference planes at a plurality of points at the same time.

Tilt angle of each of the laser beams 36b, 36c and 36d can be changed by the laser beam exit angle changing means 58. That is, when the concave lens 56 is placed on the optical axis of the collimator lens 46, the angle of each of the laser beams 36b, 36c and 36d with respect to the optical axis is widened, and the tilt angle of each of the laser beams 36b, 36c and 36d irradiated from the pentagonal prism 50 with respect to the horizontal line is increased.

In particular, if it is designed in such manner that a plurality of concave lenses (not shown) can be moved independently to or from the optical axis of the collimator lens 46, it is possible to adjust tilt angles in a plurality of stages.

Further, the light emitting element driving unit 72 drives light emission by individually modulating frequencies of the laser diodes 44a, 44b, 44c and 44d. If the modulated frequency is detected on the light receiving side, even when a plurality of laser beams are irradiated at the same time, no erroneous recognition of the laser beams occurs. Or, because the laser diodes 44a, 44b, 44c and 44d can be flashed independently, the laser diodes 44a, 44b, 44c and 44d can be turned on in such manner that only the laser beam with the desired tilt is irradiated.

Figure 5:
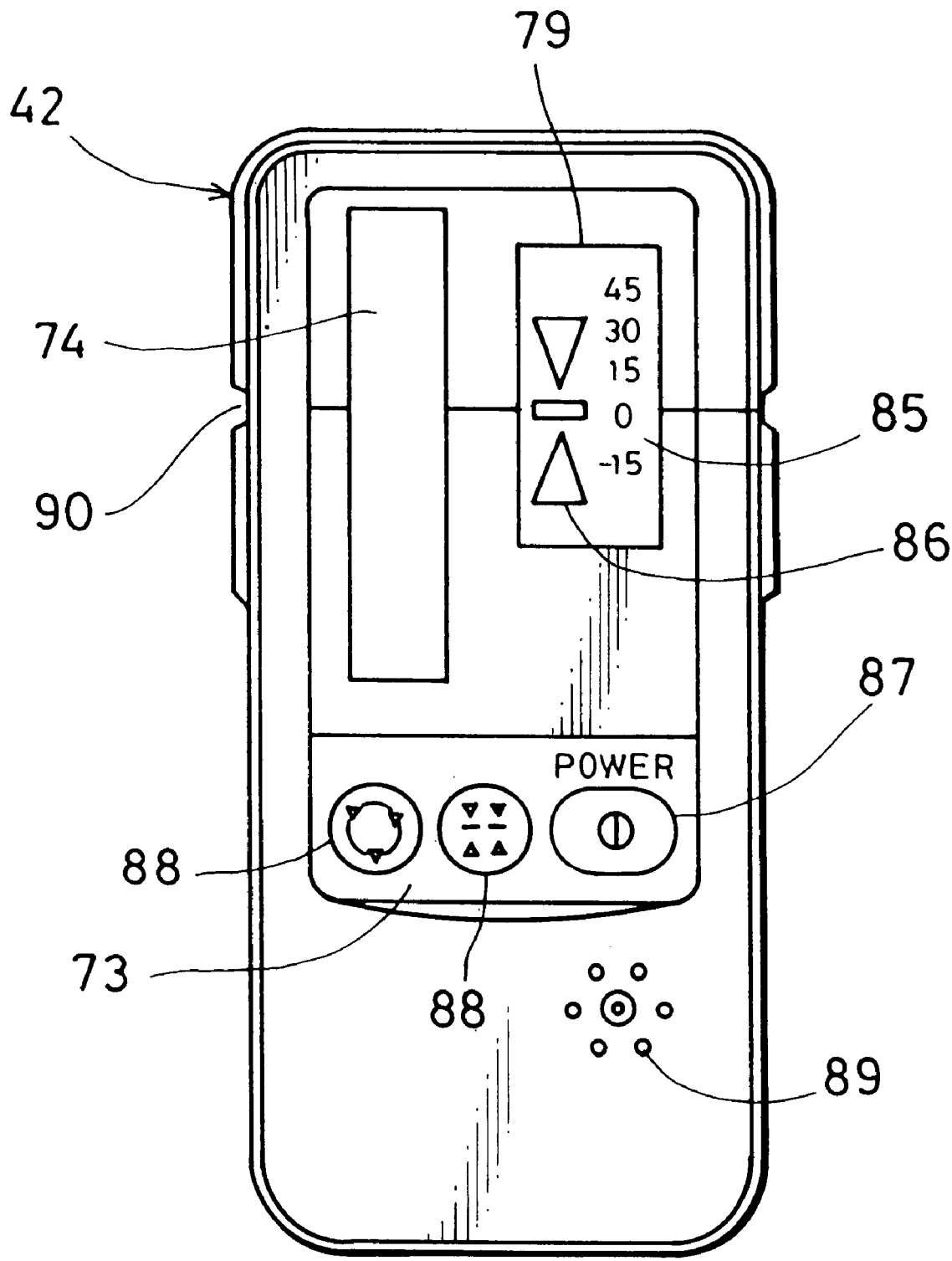
FIG. 5 is a front view of an embodiment of a photodetection system of the present invention.
Figure 6:
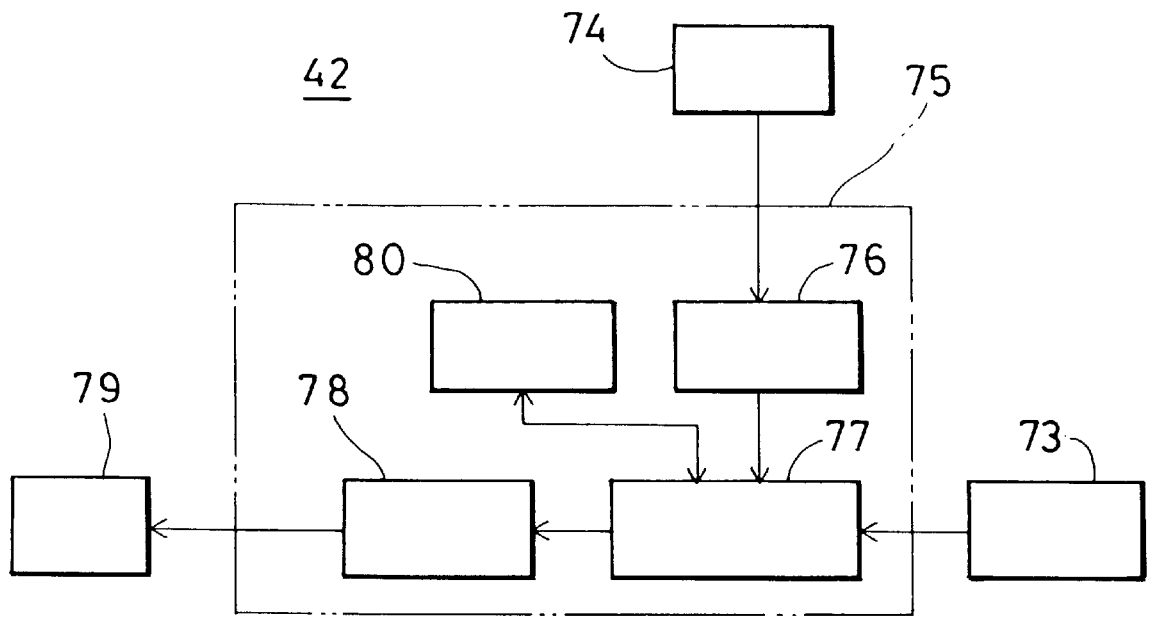
FIG. 6 is a block diagram of a photodetection status identifier to be provided on the photodetection system.

Referring to FIG. 5 and FIG. 6, description will be given now on the photodetection system 42.

On a photodetection surface of the photodetection system 42, a photodetection unit 74 in shape of an oblong tablet is arranged to convert a received light signal by photoelectric conversion, and a display unit 79 is disposed in parallel to the photodetection unit 74. On the display unit 79, there are provided a tilt angle group display 85 to show a tilt angle of each of the laser beams for each laser beam group and an arrow display 86 to show a corrected direction of irradiating position of each of the laser beams. Further, there is provided a character display (not shown) to display working information. Below the photodetection unit 74 and the display unit 79, an operation unit 73 is arranged, and the operation unit 73 comprises operation switches such as an ON-OFF switch 87, a changeover switch 88, etc. Further, the photodetection system 42 has a buzzer 89 and a notch 90 for marking.

The photodetection system 42 comprises a photodetection status identifier 75 as described below.

The photodetection status identifier 75 primarily comprises a photodetection signal detection circuit 76, an arithmetic unit 77, a display driving unit 78, and a storage unit 80. A photodetection signal from the photodetection unit 74 is inputted to the photodetection signal detection circuit 76. The photodetection signal detection circuit 76 comprises signal processing circuits such as amplifier, electric filter, etc. The signal from the photodetection signal detection circuit 76 is inputted to the arithmetic unit 77.

The storage unit 80 stores an arithmetic operation program, which calculates a predetermined information based on identification data of the laser beams received, and on tilt angle data, and on identification data of the identified laser beam. The identification data of the laser beam include the data to associate groups of a plurality of laser beams irradiated at the same time and modulation mode of the laser beams with the laser beams, and the data to associate aspect of division of laser beam (as described later) with the laser beams. Title angle data include a tilt angle of each of the laser beams in each group, e.g. the data as follows: For a first group, a tilt angle of the laser beam of a first stage is −15°, that of a second stage is 0°, that of a third stage is 15°, that of a fourth stage is 30°, and that of a fifth stage is 45°. For a second group, a tilt angle of the laser beam of a first stage is −10°, that of a second stage is 0°, that of a third stage is 10°, that of a fourth stage is 20°, and that of a fifth stage is 40°.

The arithmetic operation program is used to calculate a distance between the photodetection system 42 and the rotary laser irradiating system based on the identified photodetection laser beam, the distance between light receiving positions of two laser beams, and tilt angle data of each of the laser beams when the photodetection unit 74 receives at least two laser beams at the same time.

From the identification data of the laser beam, the arithmetic unit 77 specifies which of the laser beams 36b, 36c and 36d is the laser beam being received. The arithmetic unit 77 calculates the distance to the photodetection system 42 and to the rotary laser irradiating system 35 according to the identification data of the laser beams, tilt angle data, and the arithmetic operation program. As the result of arithmetic operation, the display driving unit 78 is controlled, and the result of calculation is displayed on the display unit 79. The display of the calculation result is not limited to the display of the distance measured, but it includes such data as: to which group the detected laser beam belongs, on which stage of the group it is, how large is the tilt angle (the tilt angle group display 85), and display of correction of irradiating position with respect to the photodetection unit 74 (the arrow display 86).

From the operation unit 73, the group of the laser beam as set by the rotary laser irradiating system 35 is selected. By selecting the group, the data for each group is selectively displayed on the display unit 79, and the arithmetic unit 77 uses the identification data of the selected group for arithmetic operation. FIG. 5 shows that the first group is selected, and the laser beam with tilt angle of 15° in the third stage is selected as the laser beam being received. It goes without saying that, if tilt angle of 0° is selected, the horizontal reference plane is selected. If the second group is selected, the display on the tilt angle group display 85 is changed to −10°, 0°, 10°, 20° and 40°.

By watching the display on the display unit 79, an operator can recognize whether the reference plane of the laser beam is correctly selected or whether operation is correctly carried out.

Reflection light of each of the laser beams 36b, 36c and 36d coming from the photodetection system 42 can be received by the photodetection unit 43. When the photodetection status identifier 75 shown in FIG. 6 is provided on the photodetection unit 43, it is possible to identify which of the laser beams 36b, 36c and 36d is the reflection light being received on the rotary laser irradiating system 35. By identifying the laser beam, the laser beam is selected, and it is possible to irradiate the laser beam only in that direction.

Figure 7:
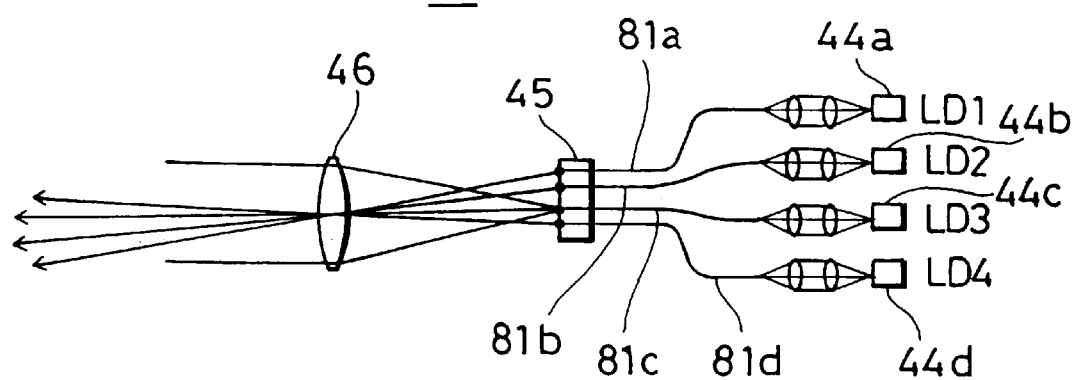
FIG. 7 is a drawing to explain an application example of an embodiment of the present invention, showing another example of the light emitting unit.

FIG. 7 shows a variation example of the laser light emitting unit 37. In case there is no space for the laser diodes 44a, 44b, 44c and 44d on the light emitting element 45, the laser diodes 44a, 44b, 44c and 44d may be arranged at different positions. Then, light beams may be guided via optical fibers 81a, 81b, 81c and 81d, and linear light emitting element may be formed.

Figure 8:
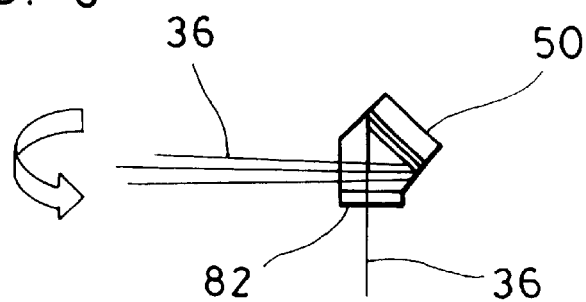
FIG. 8 is a drawing of an application example of the embodiment of the present invention, showing a case where the emitted laser beams are diffused.

In the above, the laser beams are modulated in such manner that each individual laser beam 36 has different frequency in order to identify a plurality of the laser beams 36. In case pulse interval is longer than the passing time of the laser beam 36 on the photodetection unit 74 of the photodetection system 42 due to the relation between frequency cycle and scanning speed of the laser beam 36, the photodetection system 42 may not detect the laser beam 36. In such case, a cylinder lens 82 is arranged on the lower surface of the pentagonal prism 50 as shown in FIG. 8 so that the laser beams 36a, 36b, 36c and 36d are diffused in a rotating direction and the laser beams may be irradiated in fan-like shape. Because the laser beams are spread in the rotating direction, even when pulse interval is longer than the passing time on the photodetection system 42, it is possible to eliminate the case where the laser beam is not detected by the photodetection system 42.

Further, in the above embodiment, the laser beams 36a, 36b, 36c and 36d are modulated with different frequencies, respectively, and it may be designed in such manner that each of the laser beams is divided into a plurality of parts in a rotating direction, and a dividing pattern may be changed for each of the laser beams 36a, 36b, 36c and 36d instead of modulating the laser beams.

When the laser beams thus divided are irradiated by rotary scanning, a photodetection signal issued from the photodetection unit 74 is turned to a signal specific to each laser beam. Then, the photodetection status identifier 75 can specify each of the laser beams 36a, 36b, 36c and 36d according to the signal pattern.

Figure 9:
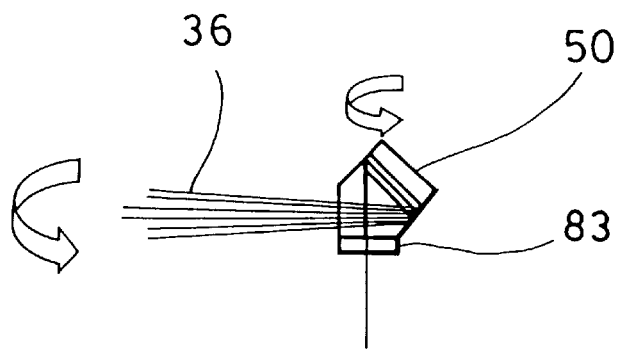
FIG. 9 is a drawing of an application example of the embodiment of the present invention, showing a case where the emitted laser beams are divided in a rotating direction.

In FIG. 9, a diffraction pattern 83 is arranged on a laser beam transmitting surface of the pentagonal prism 50. Each of the laser beams 36a, 36b, 36c and 36d is divided into three parts in a rotating direction. Further, the diffraction pattern is varied in such manner that aspect of division is different for each of the laser beams 36a, 36b, 36c and 36d. The diffraction pattern 83 can be arranged not only on the transmitting surface but on the reflection surface.

Figure 10A:
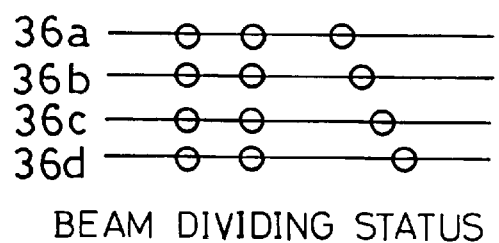
FIG. 10 (A) shows an aspect of division of the laser beams in the above application example, and FIG. 10 (B) shows an aspect of a photodetection signal.
Figure 10B:
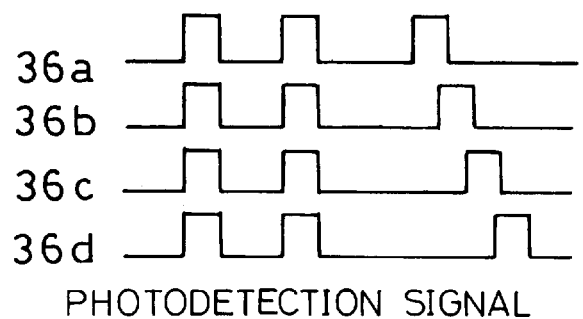
Figure 11:
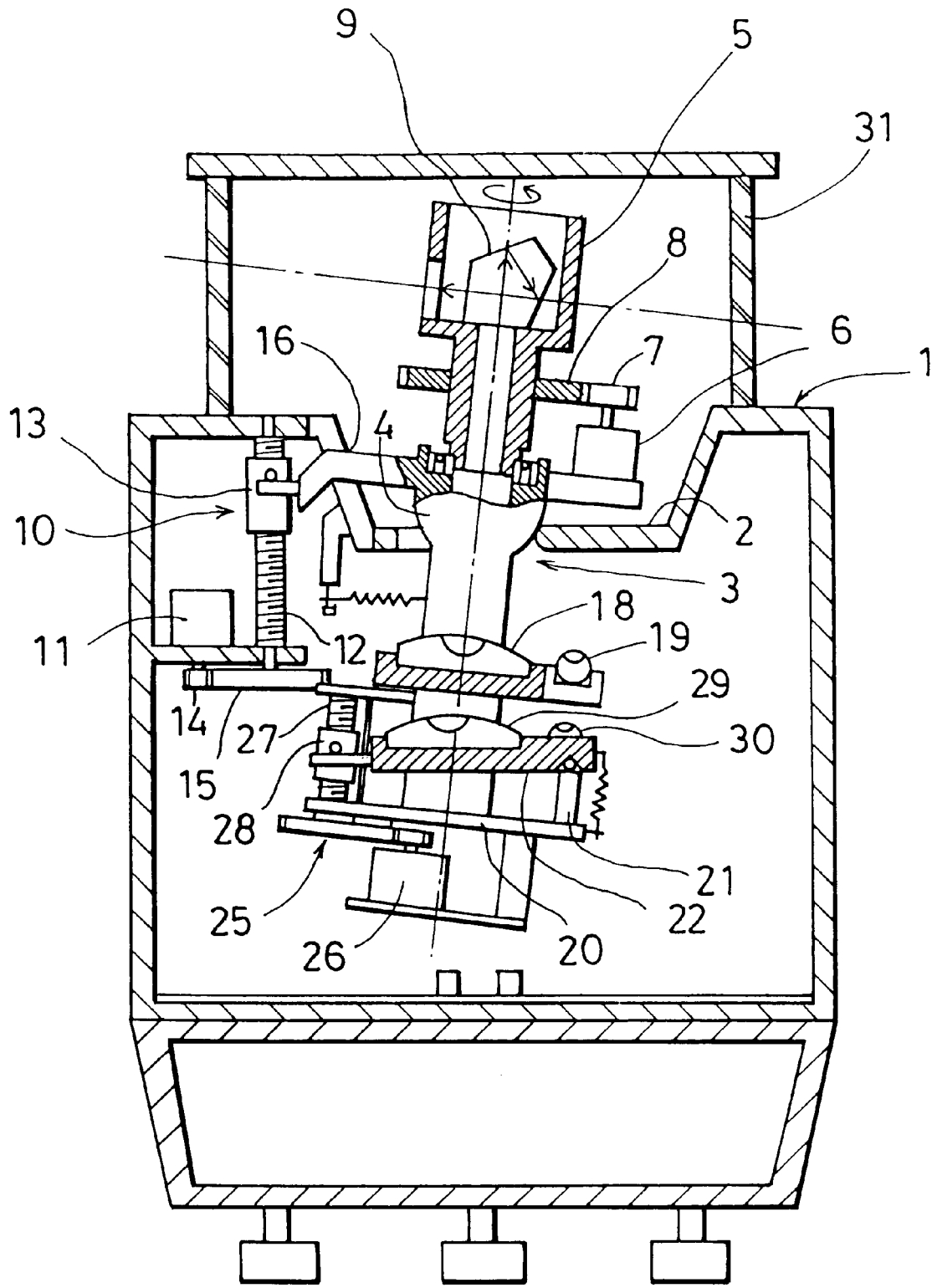
FIG. 11 is a cross-sectional view of a conventional type rotary laser irradiating system.

FIG. 10 (A) shows an example of aspect of division of the laser beams 36a, 36b, 36c and 36d. Each of the laser beams 36 is divided into three parts, and the interval between the first divided part of laser beam and the intermediate divided part of laser beam is designed as equal in all of the laser beams 36a, 36b, 36c and 36d, while the interval between the intermediate divided part of laser beam and the last divided part of laser beam is gradually increased. Therefore, as shown in FIG. 10 (B), the interval between the first pulse and the second pulse is the same for all of the laser beams 36a, 36b, 36c and 36d, while the interval between the second pulse and the third pulse is gradually made longer. As a result, by identifying generating pattern of the pulses, it is possible to identify the received laser beam among the laser beams 36a, 36b, 36c and 36d.

The control unit 39 may detect the rotating position of the rotator 38 according to the output of the encoder 55. The laser beam may be irradiated by reciprocal scanning over the range of the photodetection system 42 based on the detection result, or the laser light emitting unit 37 may be controlled and the laser beam may be rotated by limiting the emission of the laser beam only to the range of the photodetection system 42.

In the above explanation, description has been given on a case where one reference plane is detected by the photodetection unit 74, while it is needless to say that two reference planes can be detected at the same time. In this case, the distance between the rotary laser irradiating system 35 and the photodetection system 42 can be measured.

The arithmetic unit 77 calls the identification data of each of the reference planes stored in the storage unit 80. Then, the arithmetic unit 77 identifies to which stage the reference plane belongs and further identifies a tilt angle for each of the reference planes. The distance between two reference planes at the photodetecting position on the photodetection unit 74 is calculated. Then, based on the tilt angle and the photodetecting distance, the distance between the photodetection system and the rotary laser irradiating system is calculated by the arithmetic operation program. The calculation results are displayed on the display unit 79. A display unit to display the distance is not shown in the figure.

According to the present invention, the distance can be measured by simple method without using an expensive device such as a range-finder.

As described above, according to the rotary laser irradiating system of the present invention, it is possible to perform level setting within a plurality of ranges during one turn of the laser beam. This makes it possible to carry out civil engineering and construction work at a plurality of points using a single rotary laser irradiating system. Also, a plurality of tilt reference lines can be formed by laser beams at the same time and in simple manner. A mechanism required for forming tilt reference lines is extremely simple. According to the photodetection system of the present invention, laser beam can be identified even when a plurality of laser beams is irradiated at the same time. Thus, distance can be measured using a mechanism available at low cost and without causing erroneous operation.

What is claimed is:

1. A rotary laser irradiating system for emitting a plurality of laser beams by rotary irradiation and for forming a plurality of laser reference planes, comprising a laser light emitting unit for emitting said plurality of laser beams, the light emission of which is capable of being respectively controlled, and a rotator for projecting said plurality of laser beams by rotary irradiation in predetermined angles upward and downward and for forming a plurality of laser reference planes including a plane, wherein said rotary laser irradiating system forms said plurality of laser reference planes capable of being identified by controlling said light emission.

2. A rotary laser irradiating system for emitting a plurality of laser beams by rotary irradiation and for forming a plurality of laser reference planes, comprising a laser light emitting unit for emitting said plurality of laser beams, a rotator for projecting said plurality of laser beams by rotary irradiation in predetermined angles upward and downward and for forming said plurality of laser reference planes including a plane and, a diffraction member provided on said rotator and for forming dividing patterns in rotating directions in such a manner that the aspect is different for each of said plurality of laser beams, wherein said plurality of laser reference planes are formed so as to be capable of being identified.

3. A rotary laser irradiating system according to claim 1 or 2, further comprising a prism member in an optical path from said rotator to said laser light emitting unit, and said prism member being adapted to be synchronously rotated with said rotator at a predetermined rotation ratio in order to maintain the plurality of laser beams being irradiated and rotated at predetermined angles upward and downward regardless of the rotation of said rotator.

4. A rotary laser irradiating system according to claim 1 or 2, further comprising a laser beam exit angle changing means capable of being inserted in or removed from an optical path from said laser light emitting unit to said rotator, and said laser beam exit angle changing means changes the exit angles of the plurality of laser beams emitted from said laser light emitting unit.

5. A rotary laser irradiating system according to claim 1, wherein said laser light emitting unit has a plurality of independently driven light emitting elements for emitting said plurality of laser beams, wherein each of said light emitting elements can be modulated to different frequencies.

6. A rotary laser irradiating system according to claim 1 or 2, wherein said laser light emitting unit has a plurality of independently driven light emitting elements for emitting said plurality of laser beams, and only necessary reference planes are formed from each of the light emitting elements being switched on and off.

7. A rotary laser irradiating system according to claim 1, wherein said rotator comprises a diffusion member for diffusing said plurality of laser beams in fan shapes in the rotating directions.

8. A rotary laser irradiating system according to claim 1 or 2, further comprising a photodetection system, wherein said photodetection system comprises a photodetection unit for receiving said plurality of laser beams capable of being identified, a photodetection status identifier for identifying the laser beams being received by said photodetection unit based on stored identification data and for calculating a corrected direction based on a photodetection signal from said photodetection unit, and a display unit for displaying a result of said calculation of said photodetection status identifier.

9. A rotary laser irradiating system according to claim 8, wherein said photodetection status identifier stores identification data for each type of laser beam and is capable of identifying the laser beam based on said identification data.

10. A rotary laser irradiating system according to claim 9, wherein said photodetection status identifier detects change of the exit angle caused by an exit angle changing means based on the photodetection signal of said photodetection unit, and changes the group display of said identification data being displayed on said display unit.

11. A rotary laser irradiating system according to claim 9, wherein said identification data is selected from the group consisting of the type of laser beam and the tilt angle of the laser beam.

12. A rotary laser irradiating system according to claim 8, wherein said photodetection status identifier calculates distance to the rotary laser irradiating system based on photodetecting positions of two laser beams and based on the tilt angles of the two laser beams according to said identification data when said photodetection unit receives at least said two laser beams.

13. A rotary laser irradiating system according to claim 2, wherein said rotator comprises a diffusion member for diffusing a plurality of laser beams in fan shapes in the rotating directions.

* * * * *